(12) United States Patent
Cutajar (10) Patent No.: US 8,824,653 B2
(45) Date of Patent: *Sep. 2, 2014

(54) IDENTIFYING ACTIONS TO TAKE WITH REGARD TO REPEAT CALLERS

(75) Inventor: Louis J. Cutajar, Woodstock, GA (US)

(73) Assignee: Cox Communications, Inc., Atlanta, GA (US)

(*) Notice: Subject to any disclaimer, the term of this patent is extended or adjusted under 35 U.S.C. 154(b) by 510 days.

This patent is subject to a terminal disclaimer.

(21) Appl. No.: 12/877,523

(22) Filed: Sep. 8, 2010

(65) Prior Publication Data

US 2012/0057690 A1    Mar. 8, 2012

(51) Int. Cl.
*H04M 3/42* (2006.01)
*H04M 3/523* (2006.01)

(52) U.S. Cl.
CPC ........ *H04M 3/523* (2013.01); *H04M 2203/408* (2013.01); *H04M 2201/12* (2013.01)
USPC ............. 379/207.16; 379/372; 379/373.01; 379/373.02; 379/373.03; 379/373.04

(58) Field of Classification Search
USPC ............. 379/110.01, 190, 201.01, 220.01, 379/265.02–266.1; 455/404.1; 705/7.16–7.25
See application file for complete search history.

(56) References Cited

U.S. PATENT DOCUMENTS

| | | | |
|---|---|---|---|
| 6,480,597 B1* | 11/2002 | Kult et al. | 379/242 |
| 2003/0065548 A1* | 4/2003 | Schmidt | 705/9 |
| 2005/0094799 A1* | 5/2005 | Elsey | 379/266.04 |
| 2008/0226059 A1* | 9/2008 | Shaffer et al. | 379/266.05 |
| 2010/0054449 A1* | 3/2010 | Bushey et al. | 379/265.02 |
| 2010/0056099 A1* | 3/2010 | Kazmi | 455/404.1 |

* cited by examiner

*Primary Examiner* — Mohammad Islam
(74) *Attorney, Agent, or Firm* — Merchant & Gould (57) ABSTRACT

A call handling system receives an incoming call from a caller. In response to receiving the incoming call, the call handling system determines a call count for the caller. The call count for the caller is based on a number of calls in a sequence of calls received by the call handling system from the caller, including the incoming call. A maximum amount of time between any of the calls in the sequence of calls does not exceed an expiration period. Based on the call count for the caller, the call handling system identifies and performs an action to take with regard to the incoming call.

20 Claims, 10 Drawing Sheets

| | 804A | 804B | 804C | 804D | 804E | | 804N |
|---|---|---|---|---|---|---|---|
| 802A Account number | | | | | | | |
| 802B Dialed number | | | | | | | |
| 802C Data Call Count | | | | | | ⋮ | |
| 802D Telephone Call Count | | | | | | | |
| 802E Billing Call Count | | | | | | | |
| 802F Sales Call Count | | | | | | | |
| 802G Other Call Count | | | | | | | |
| 802H Operator ID | | | | | | | |
| 802I Tracking Number | | | | | | | |
| 802J Valid Count | | | | | | | |
| 802K Date | | | | | | | |

IDENTIFYING ACTIONS TO TAKE WITH REGARD TO REPEAT CALLERS

BACKGROUND

There are many situations in which a person might need to speak with an agent of an organization. For example, the person might need to speak with an agent of a cable television company when the person's cable television is not working. In another example, the person might need to speak with an agent of a company when the person has a question about a bill received from the company.

In some situations, the person might need to call the organization multiple times. For example, the person might call a cable television company again if the person's cable television stops working again. In this example, the person can become annoyed by having to call the cable television company multiple times. In another example, a person might have expressed an interest during an earlier call in purchasing a product from a company and is calling again to purchase the product.

SUMMARY

A call handling system receives an incoming call from a caller. In response to receiving the incoming call, the call handling system identifies an action to perform with regard to the incoming call. The call handling system then performs the identified action with regard to the incoming call. The call handling system identifies the action based on a call count for the caller. The call count for the caller is based on a number of calls in a sequence of calls received by the call handling system from the caller, including the incoming call. A maximum amount of time between any of the calls in the sequence of calls does not exceed an expiration period. In this way, the call handling system can, in some embodiments, treat callers differently depending on whether calls have recently been received from the callers.

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

DETAILED DESCRIPTION

Figure 1:
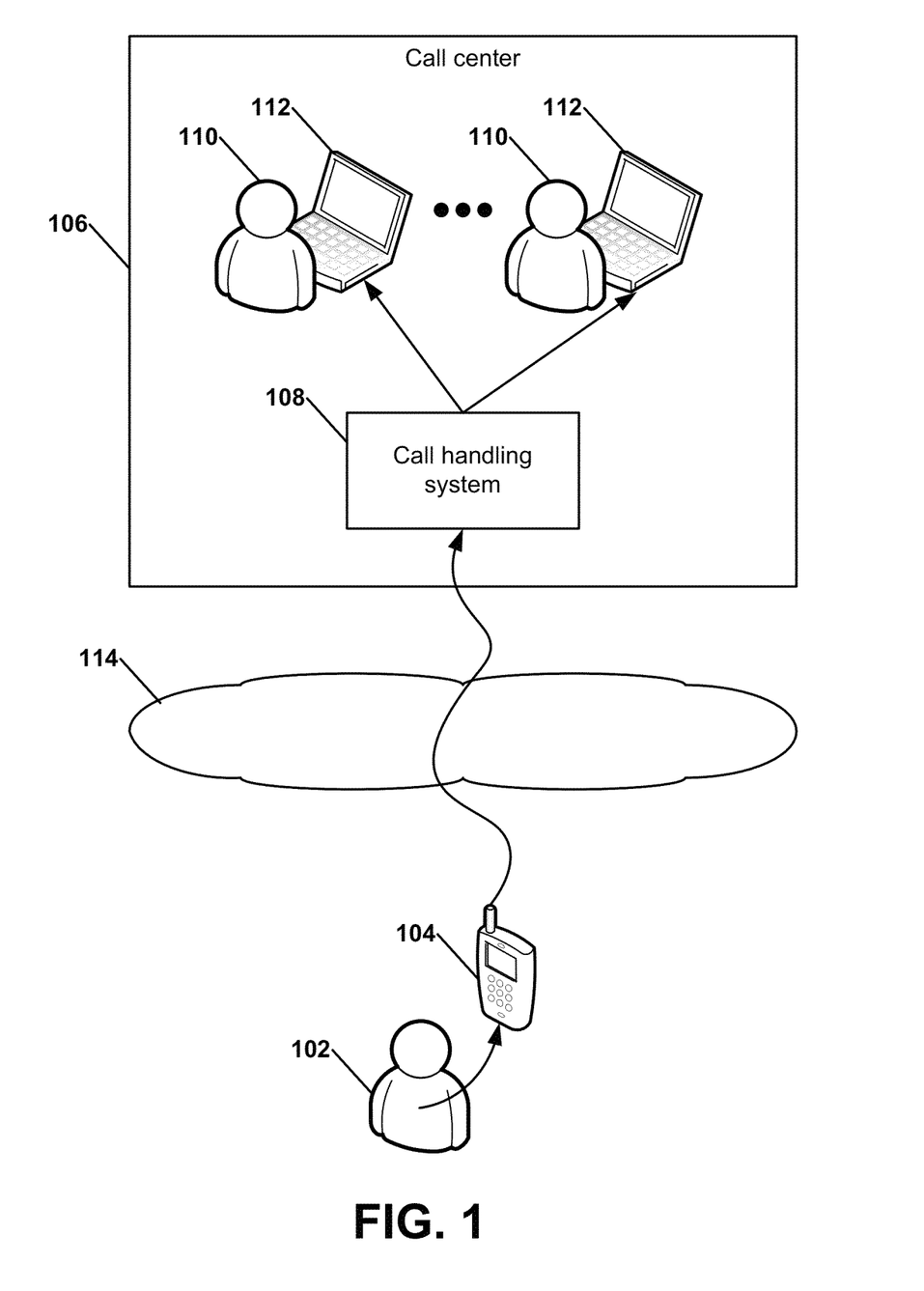
FIG. 1 is a block diagram illustrating an example system.

FIG. 1 is a block diagram illustrating an example system 100. As illustrated in the example of FIG. 1, the system 100 includes a caller 102. The caller 102 is a person who wants to conduct a telephony call with an agent of an entity. In various embodiments, the entity can be various types of entities. For example, the entity can be a business association, a governmental entity, a non-profit entity, or another type of entity.

The caller 102 may want to conduct a telephony call with an agent of the entity for a variety of reasons. For example, the caller 102 may want to speak with an agent of the entity to resolve problems with a product or service provided by the entity to the caller 102. In another example, the caller 102 may want to speak with an agent of the entity to resolve questions regarding an invoice sent by the entity to the caller 102. In yet another example, the caller 102 may want to speak with an agent of the entity to buy a product, make a donation, or schedule an appointment.

The caller 102 uses a telephone 104 to initiate the call. In the example of FIG. 1, the telephone 104 is a handheld wireless telephone. It should be appreciated that in other embodiments, the caller 102 can use other types of communication devices to initiate the call. For example, the caller 102 can use a landline telephone, a personal computer, or another type of communication device to initiate the call.

As illustrated in the example of FIG. 1, the system 100 includes a call center 106. The call center 106 includes a call handling system 108. The call handling system 108 is a system comprising one or more computing devices. Furthermore, the call center 106 includes a set of agents 110. The agents 110 are people who represent the entity. The agents 110 use computers 112.

When the caller 102 initiates the call, the call handling system 108 receives the call from the telephone 104 via a network 114. In response to receiving the call, the call handling system 108 determines a call count for the caller 102. The call count for the caller 102 is based on a number of calls in a sequence of calls received by the call handling system 108 from the caller 102. The sequence of calls includes the current call from the caller 102. A maximum amount of time between any of the calls in the sequence of calls does not exceed an expiration period. For example, in some embodiments, the expiration period is four days. In this example, the call count for the caller 102 is three (3) if the call handling system 108 receives a first call on Monday, a second call on Wednesday, and the current call on Saturday. In this example, there is no period of time that exceeds four days. In another example, the call count is two if the call handling system 108 receives a first call on Monday, a second call on Saturday, and the current call on Sunday. In this example, the call count is two rather than three because four days passed between the first and the second call. Hence, in this example, there are only two calls in the sequence of calls that includes the current call in which the maximum amount of time between any of the calls is four days. It should be appreciated that other embodiments can use longer or shorter expiration periods.

After the call handling system 108 determines the call count for the caller 102, the call handling system 108 identifies, based on the call count for the caller 102, an action from among a plurality of actions available to take with regard to the current call. The call handling system 108 then performs the identified action with regard to the call. As described in this document, the call handling system 108 can identify and take a wide variety of actions with regard to the call. For example, the call handling system 108 can route the call to a particular one of the agents 110 when the call count for the caller 102 exceeds a given threshold. In this example, the particular one of the agents 110 can be a supervisor. In another example, the call handling system 108 can bump the call to the front of a list of calls on hold if the call count for the caller 102 is within a given range. In this example, the caller 102 may get to speak with one of the agents 110 sooner because the caller 102 does not have to wait on hold behind earlier callers. In such ways, the call handling system 108 can help direct resources to callers who have problems that were not resolved during a first call to the entity.

Figure 2:
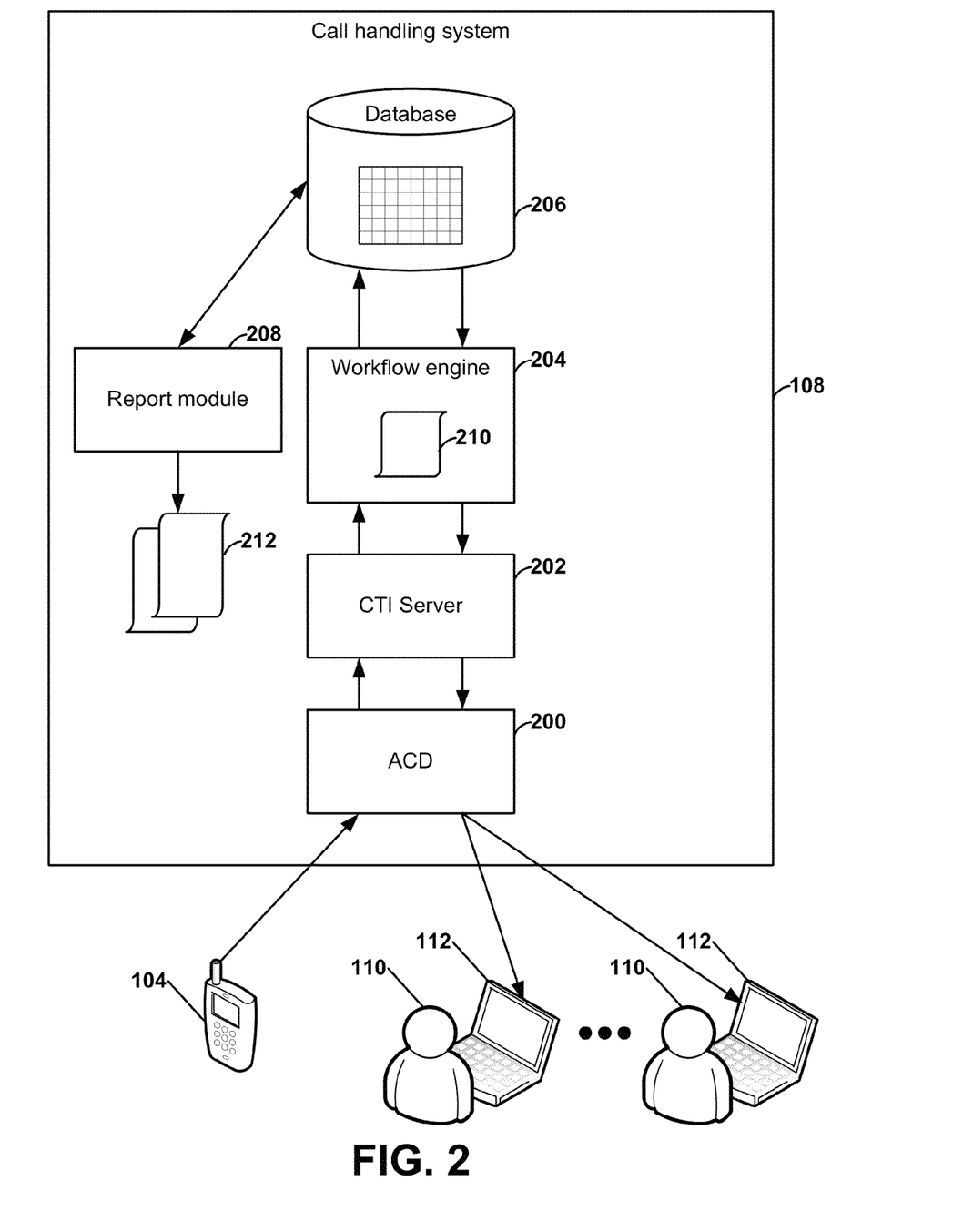
FIG. 2 is a block diagram illustrating example details of a call handling system.

FIG. 2 is a block diagram illustrating example details of the call handling system 108. As illustrated in the example of FIG. 2, the call handling system 108 includes an automatic call distributor (ACD) 200, a computer-telephony interface (CTI) server 202, a workflow engine 204, a database 206, and a report module 208. In some embodiments, the ACD 200, the CTI server 202, the workflow engine 204, the database 206, and the report module 208 are implemented on a single computing device. In other embodiments, the ACD 200, the CTI server 202, the workflow engine 204, the database 206, and the report module 208 are implemented on two or more communicating computing devices. For example, in such embodiments, the ACD 200 can be implemented on one computing device and the CTI server 202, the workflow engine 204, the database 206, and the report module 208 can be implemented on another computing device. Furthermore, in some embodiments, the ACD 200, the CTI server 202, the workflow engine 204, and/or the report module 208 can be implemented as computer-executable instructions that, when executed by processing units of one or more computing devices, cause the computing devices to provide the ACD 200, the CTI server 202, the workflow engine 204, and the report module 208.

Figure 4:
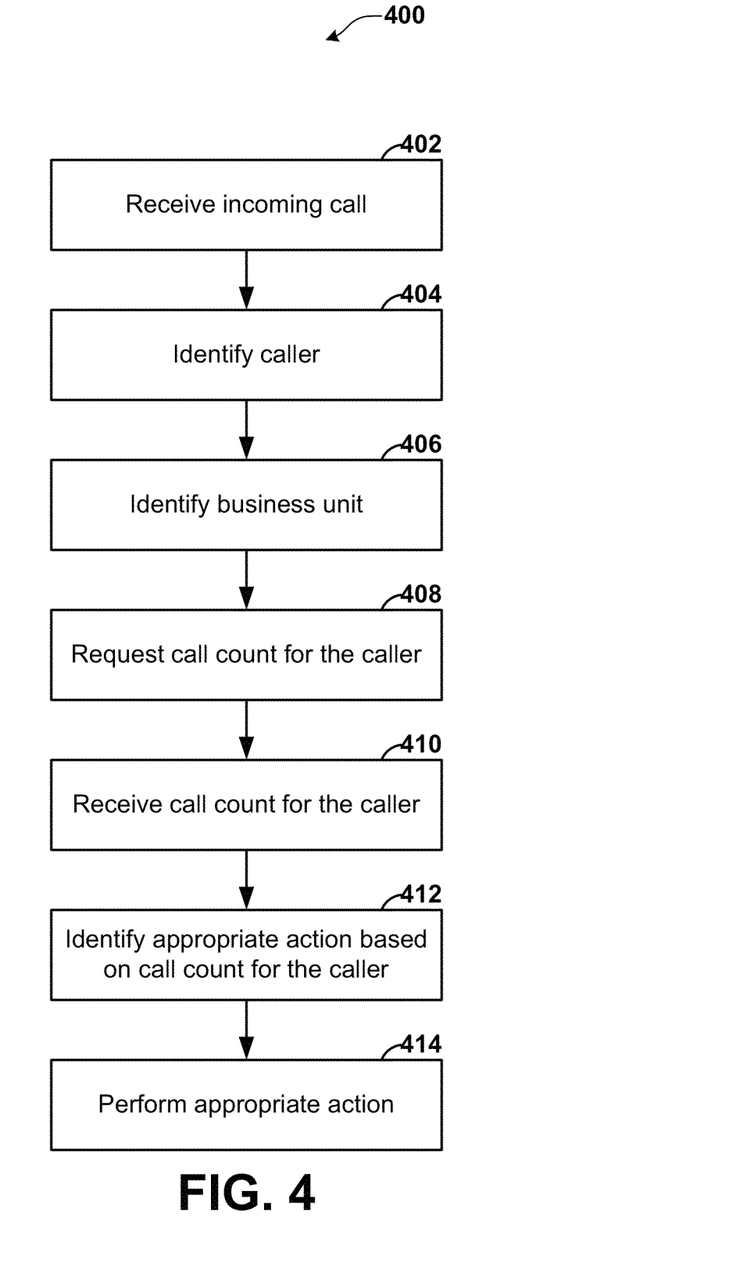
FIG. 4 is a flowchart illustrating an example operation performed by the automatic call distributor (ACD).
Figure 5:
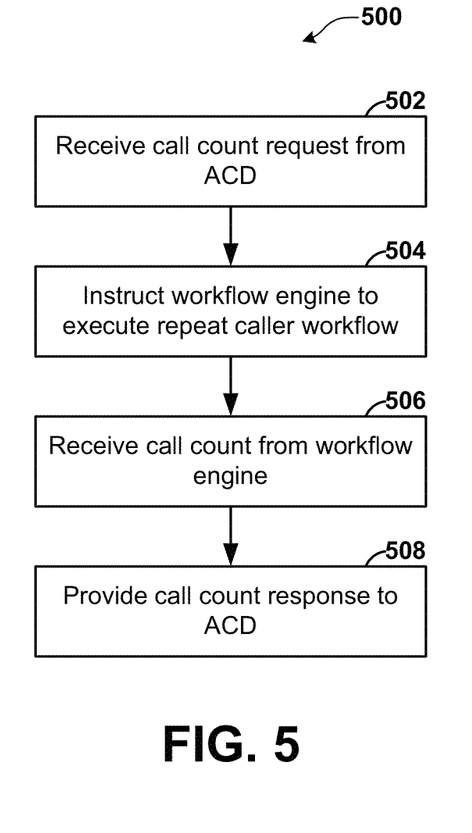
FIG. 5 is a flowchart illustrating an example operation performed by a Computer-Telephone Interface (CTI) server.
Figure 6:
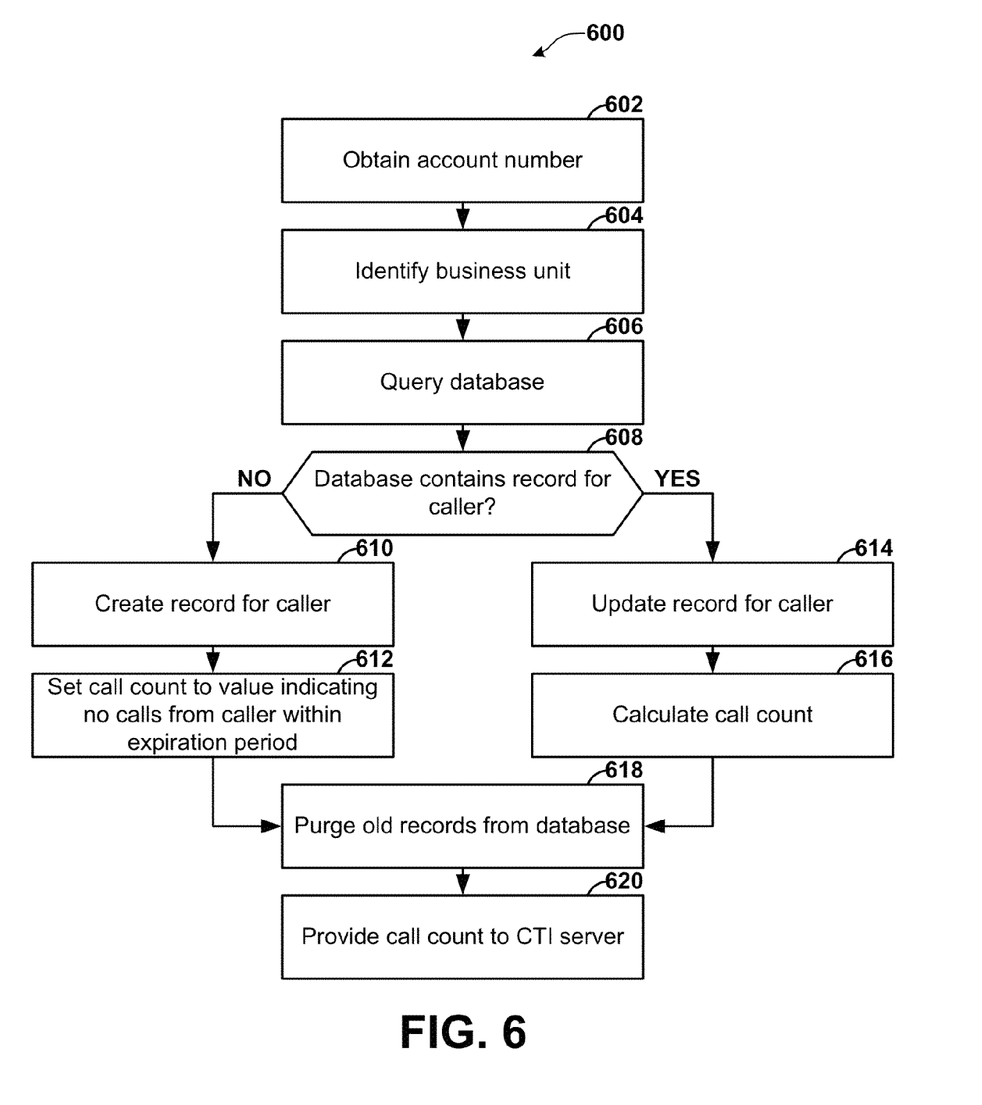
FIG. 6 is a flowchart illustrating an example operation performed by a workflow engine when the workflow engine executes a repeat caller workflow.

The ACD 200 receives calls and determines how to route the calls to the computers 112 used by the agents 110. FIG. 4, described in detail below, illustrates one example operation performed by the ACD 200 to determine how to route a call. The CTI server 202 provides a computer-telephony system interface. The ACD 200 uses the CTI server 202 to determine call counts for callers. FIG. 5, described in detail below, illustrates one example operation performed by the CTI server 202. The workflow engine 204 is a system that is able to execute workflows, such as repeat caller workflow 210, provided to the workflow engine 204. FIG. 6, described in detail below, illustrates one example operation performed by the workflow engine 204 when the workflow engine 204 executes the repeat caller workflow 210. The database 206 stores data regarding numbers of times callers have called. In various embodiments, the database 206 is implemented in various ways. For example, the database 206 can be implemented as an Oracle database.

Figure 9:
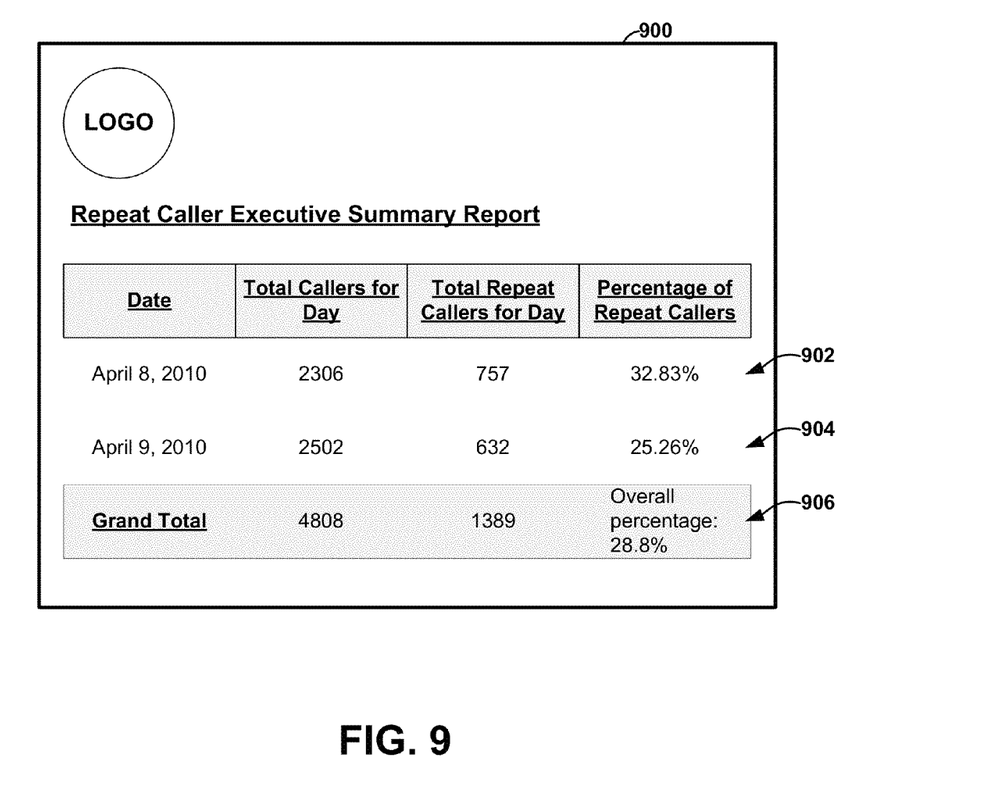
FIG. 9 illustrates an example report that summarizes repeat calls by day.

The report module 208 uses data in the database 206 to generate reports 212. The reports 212 summarize data in the database 206. In various embodiments, the reports 212 contain various types of data. For example, one of the reports 212 can include columns listing total numbers of callers on various days, numbers of repeat callers on each of the days, and percentages of repeat callers on each of the days. FIG. 9, described in detail below, illustrates such a report. Repeat callers are callers from whom the call handling system 108 has received multiple calls. In another example, one of the reports 212 breaks down the percentages of repeat callers by business unit. In yet another example, one of the reports 212 breaks down the numbers and percentages of times that callers call again after speaking with individual ones of the agents 110. In yet another example, one of the reports 212 lists each repeat caller along with numbers of calls made to each business unit.

Figure 3:
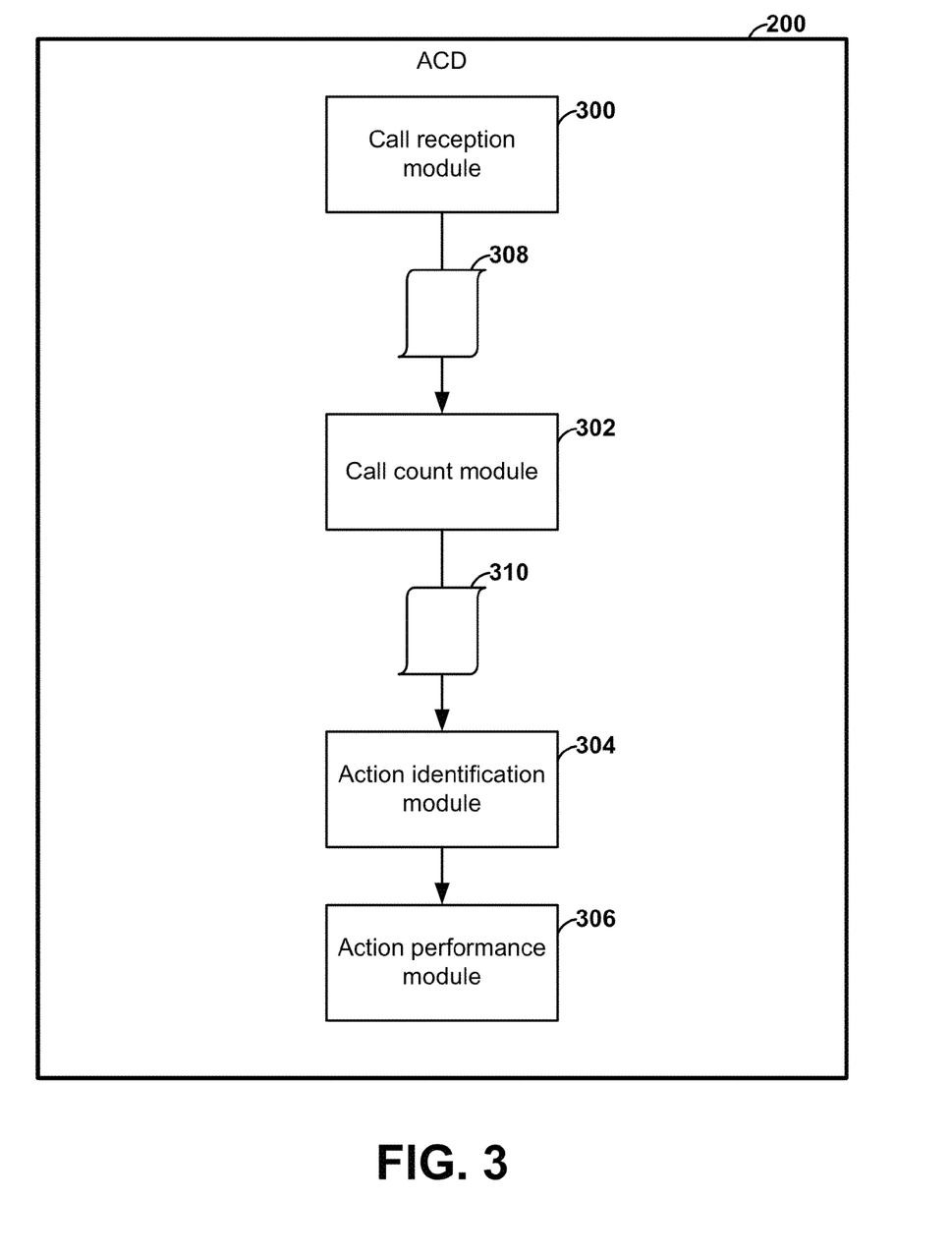
FIG. 3 is a block diagram illustrating example details of an automatic call distributor (ACD).

FIG. 3 is a block diagram illustrating example details of the ACD 200. As illustrated in the example of FIG. 3, the ACD 200 comprises a call reception module 300, a call count module 302, an action identification module 304, and an action performance module 306. As described in detail below with regard to FIG. 4, the call reception module 300 receives an incoming call from a caller, such as the caller 102. In response, the call reception module 300 provides call information 308 to the call count module 302. The call information 308 comprises information about the incoming call. For example, the call information 308 can comprise information that identifies the caller 102, information that identifies a number dialed by the caller 102, and so on. The call count module 302 then uses the call information 308 to identify a call count 310 for the caller 102. The call count module 302 provides the call count 310 to the action identification module 304. The action identification module 304 uses the call count 310 to identify an action. The action performance module 306 then performs the identified action with regard to the incoming call.

In various embodiments, the call reception module 300, the call count module 302, the action identification module 304, and the action performance module 306 are implemented in various ways. For example, the ACD 200 can comprise one or more application-specific integrated circuits (ASICs) that cause the ACD 200 to perform the actions ascribed in this patent document to the call reception module 300, the call count module 302, the action identification module 304, and/or the action performance module 306.

In another example, the call reception module 300, the call count module 302, the action identification module 304, and/or the action performance module 306 can comprise sets of computer-executable instructions stored on one or more computer-readable storage media. In this example, the computer-executable instructions of the call reception module 300, the call count module 302, the action identification module 304, and the action performance module 306 may be parts of a single logical block of software code. Alternatively, in this example, the computer-executable instructions of the call reception module 300, the call count module 302, the action identification module 304, and/or the action performance module 306 may be divided into two or more logical blocks of software code. In this example, the actions ascribed in this patent document to the call reception module 300, the call count module 302, the action identification module 304, and the action performance module 306 are performed when the computer-executable instructions of the call reception module 300, the call count module 302, the action identification module 304, and the action performance module 306 are executed.

FIG. 4 is a flowchart illustrating an example operation 400 performed by the ACD 200. As illustrated in the example of FIG. 4, the operation 400 begins when the call reception module 300 of the ACD 200 receives an incoming call from the telephone 104 (402). When the call reception module 300 receives the incoming call from the telephone 104, the call reception module 300 identifies the caller 102 (404). In various embodiments, the call reception module 300 identifies the caller 102 in various ways. For example, the call reception module 300 can identify the caller 102 based on a telephone number associated with the telephone 104. In another example, the call reception module 300 can identify the caller 102 by prompting the caller 102 to provide answers to one or more questions. For instance, in this example, the call reception module 300 can prompt the caller 102 to enter an account number. In this example, the call reception module 300 can utilize an Interactive Voice Response (IVR) system to prompt the caller 102 to provide the answers and to process the answers.

After the call reception module 300 identifies the caller 102, the call reception module 300 identifies a relevant business unit from among a plurality of business units (406). The relevant business unit is the business unit that the caller 102 wants to talk about. For example, the entity can have a data delivery business unit, a video delivery business unit, a telephony business unit, and a billing business unit. In this example, the call reception module 300 can determine that the video delivery business unit is the relevant business unit. In various embodiments, the call reception module 300 identifies the relevant business unit in various ways. For example, the call reception module 300 can identify the relevant business unit by prompting the caller 102 to answer one or more questions regarding the relevant business unit. In another example, the call reception module 300 can identify the relevant business unit based on a telephone number used by the caller 102 when making the call. In this example, different ones of the business units can be associated with different telephone numbers.

After the call reception module 300 identifies the relevant business unit, the call count module 302 of the ACD 200 provides a call count request to the CTI server 202 (408). The call count request is a request for a call count for the caller 102. In some embodiments, the call count request specifies the relevant business unit. FIG. 5, described in detail below, illustrates one example operation performed by the CTI server 202 in response to receiving a call count request. In other embodiments, the CTI server 202 performs operations other than that illustrated in the example of FIG. 5 in response to receiving call count requests.

Figure 7:
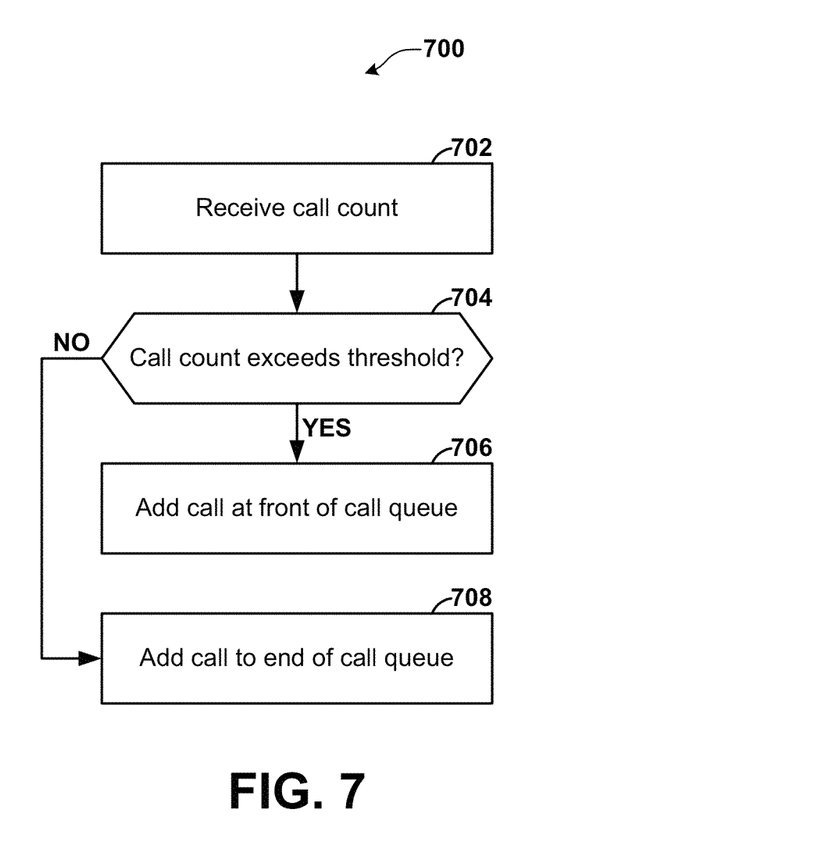
FIG. 7 is a flowchart illustrating an example operation performed by the ACD to identify and perform an appropriate action from among a plurality of available actions to take with regard to the call.

Subsequently, the call count module 302 receives a call count response from the CTI server 202 (410). The call count response specifies the call count for the caller 102. After the ACD 200 receives the call count response, the action identification module 304 of the ACD 200 identifies, based on the call count for the caller 102, an appropriate action from among a plurality of available actions to take with regard to the call (412). In various embodiments, the action identification module 304 identifies the appropriate action in various ways. FIG. 7, described in detail below, illustrates one example operation to identify and perform an appropriate action from among a plurality of available actions to take with regard to the call. In other embodiments, operations other than that illustrated in the example of FIG. 7 are performed.

After the appropriate action is identified, the action performance module 306 of the ACD 200 performs the appropriate action with regard to the call (414). For example, the agents 110 are divided into a plurality of subgroups. In this example, the appropriate action can be to route the call to an agent in a given subgroup in the plurality of subgroup. In this example, the action performance module 306 routes the call to an agent in the given subgroup. In another example, the agents 110 include senior agents and junior agents. In this way, the appropriate action can be route the call to a senior agent instead of one of the junior agents. In this example, the action performance module 306 routes the call to the senior agent.

FIG. 5 is a flowchart illustrating an example operation 500 performed by the CTI server 202. As illustrated in the example of FIG. 5, the operation 500 begins when the CTI server 202 receives a call count request from the ACD 200 (502). In various embodiments, the call count request is formatted in various ways. For example, the call count request can have the following format: yRPTCLLERxx. In this format "y" represents a character that identifies the relevant business unit and "xx" represents characters that identify an expiration period in days.

In response to the call count request, the CTI server 202 communicates with the workflow engine 204 to instruct the workflow engine 204 to execute the repeat caller workflow 210 (504). In various embodiments, the CTI server 202 communicates with the workflow engine 204 in various ways. For example, the workflow engine 204 provides an API. In this example, the CTI server 202 communicates with the workflow engine 204 by invoking a method of the API. In another example, the workflow engine 204 provides a web services interface. In this example, the workflow engine 204 communicates with the workflow engine 204 by sending web services requests to invoke methods of the web services interface.

After the CTI server 202 instructs the workflow engine 204 to execute the repeat caller workflow 210, the CTI server 202 receives a call count from the workflow engine 204 (506). The workflow engine 204 then provides a call count response to the ACD 200 (508). The call count response specifies the call count for the caller 102.

FIG. 6 is a flowchart illustrating an example operation 600 performed by the workflow engine 204 when the workflow engine 204 executes the repeat caller workflow 210. As illustrated in the example of FIG. 6, the operation 500 begins when the workflow engine 204 obtains an account number for the caller 102 (602).

The workflow engine 204 then identifies a relevant business unit (604). In various embodiments, the workflow engine 204 identifies the relevant business unit in various ways. For example, in some embodiments, the call count request provided by the ACD 200 to the CTI server 202 has the format yRPTCLLERxx, as discussed above. In this example, the CTI server 202 forwards the call count request to the workflow engine 204 when the CTI server 202 instructs the workflow engine 204 to execute the repeat caller workflow 210. In this example, the workflow engine 204 identifies the relevant business unit based on a character in the call count request at position "y."

After identifying the relevant business unit, the workflow engine 204 queries the database 206 for records that specify account numbers that match the account number for the caller 102 (606). In various embodiments, the workflow engine 204 can use various queries to query the database 206 for records that specify account numbers that match the account number for the caller 102. For example, the workflow engine 204 can use the following query:

```
SELECT * FROM
REPEAT_CALLER WHERE
:efAccountNumber = REPEAT_CALLER.ACCT_NUMBER.
```

In this example, "REPEAT_CALLER" is the name of a table in the database 206 containing records for callers, "efAccountNumber" is the account number for the caller 102, and "REPEAT_CALLER.ACCT_NUMBER" is the name of a column in the table containing account numbers for callers.

After querying the database 206, the workflow engine 204 determines whether the query returned any records that specify account numbers that match the account number for the caller 102 (608). If the workflow engine 204 determines that the query did not return any records ("NO" of 608), the workflow engine 204 creates a new record in the database 206 for the caller 102 (610). In various embodiments, the record for the caller 102 contains various attributes. For example, the record for the caller 102 can contain an account number attribute that specifies an account number for the caller 102, counter attributes for each business unit, a most-recent-call attribute, and an attribute indicating one of the agents 110 who last spoke with the caller 102. The most-recent-call attribute indicates a most recent time that the ACD 200 received a call from the caller 102. In this example, when the workflow engine 204 creates the record for the caller 102, the workflow engine 204 sets the counter attribute for the relevant business unit to one (1). Furthermore, when the workflow engine 204 creates the record for the caller 102, the workflow engine 204 sets the most-recent-call attribute to indicate the current time (i.e., time and date). After creating the record in the database 206 for the caller 102, the workflow engine 204 sets the call count for the caller 102 to a value that indicates that the ACD 200 has received no calls from the caller within an expiration period following a most recently received call from the caller (612). For example, the workflow engine 204 can set the call count for the caller 102 to zero.

Alternatively, if the workflow engine 204 determines that the query returned an existing record having an account number attribute that matches the account number for the caller 102 ("YES" of 608), the workflow engine 204 updates the record (614). The workflow engine 204 updates the record to increase a counter attribute in the record. For example, the record can include counter attributes for different business units. In this example, if the counter attribute for the relevant business unit previously had a value of three (3), the workflow engine 204 increases the counter attribute for the relevant business unit to four (4). Furthermore, the workflow engine 204 updates the record such that the most-recent-call attribute of the record indicates the current time.

After updating the record, the workflow engine 204 calculates the call count for the caller (616). In various embodiments, the workflow engine 204 calculates the call count for the caller 102 in various ways. For example, in some embodiments, the workflow engine 204 calculates the call count for the caller 102 by adding together the counter attributes of the record for each of the business units. For example, if there is a data delivery business unit, a video delivery business unit, and a billing business unit, the workflow engine 204 calculates the call count for the caller 102 by adding the counter attribute for the data delivery business unit, the counter attribute for the video delivery business unit, and the counter attribute for the billing business unit. In another example, the workflow engine 204 calculates the call count for the caller 102 as being just the counter attribute for the relevant business unit. In yet another example, the record includes an attribute that indicates a total number of calls received in all business units. In this example, the workflow engine 204 uses this attribute as the call count for the caller 102.

To further explain the actions of the workflow engine 204 with regard to multiple business units, consider that the ACD 200 can receive a second incoming call from the caller 102. In response to this second incoming call, the workflow engine 204 can determine that the caller 102 now wants to speak about another one of the business units. In this situation, the workflow engine 204 updates the record for the caller 102 to increase the counter attribute for the other one of the business units. The workflow engine 204 can calculate a second call count for the caller based at least in part on the counter attribute for the other business unit. The ACD 200 can then use the second call count to identify a second action from among the plurality of actions available to take with regard to the second incoming call. The ACD 200 then performs the second action.

Reference is now made again to FIG. 6. After setting the call count for the caller 102 in step 612 or calculating the call count for the caller 102 in step 616, the workflow engine 204 purges old records from the database 206 (618). In other words, the workflow engine 204 removes from the database 206 records for callers from whom the call handling system 108 has not received a call within an expiration period. Because the workflow engine 204 removes such records from the database 206, the database 206 does not contain a record for a given caller when the expiration period has passed after the last call from the given caller. Consequently, the database 206 only contains a record for the given caller if a maximum time between calls in a sequence of calls from the given caller that includes the current call does not exceed the expiration period. For example, if the expiration period is two days and the call handling system 108 has not received a call from a given caller in three days, the workflow engine 204 removes the record for the given caller from the database 206. In this example, the maximum amount of time between a next call and a most recent call from the given caller is necessarily greater than the expiration period. In some embodiments, the workflow engine 204 does not purge old records from the database 206 each time the call handling system 108 performs the operation 600. Rather, in some embodiments, the workflow engine 204 only purges the old records from the database 206 on a periodic basis, such as once per day.

In some embodiments, the workflow engine 204 determines the expiration period in various ways. For example, the call count request can have the following format: yRPT-CLLERxx. In this format "y" represents a character that identifies the relevant business unit and "xx" represents characters that identify an expiration period in days. In this example, the CTI server 202 forwards the call count request to the workflow engine 204 when the CTI server 202 instructs the workflow engine 204 to begin the repeat caller workflow 210. In this example, the workflow engine 204 uses the characters at the position "xx" to determine the expiration period. Furthermore, in this example, if "xx" identifies an undesirable expiration period (e.g., less than one (1) day or more than ten (10) days), the workflow engine 204 determines that the expiration period is a default expiration period (e.g., ten (10) days). In another example, the expiration period is hardcoded into the repeat caller workflow 210. In yet another example, the expiration period is an environment variable for the workflow engine 204.

After purging the old records from the database 206, the workflow engine 204 provides the call count for the caller 102 to the CTI server 202 (620).

FIG. 7 is a flowchart illustrating an example operation 700 performed by the ACD 200 to identify and perform an appropriate action from among a plurality of available actions to take with regard to the call. As illustrated in the example of FIG. 7, the operation 700 begins when the action identification module 304 of the ACD 200 receives the call count 310 for the caller 102 from the CTI server 202 (702). In response to receiving the call count 310 for the caller 102, the action identification module 304 determines whether the call count 310 for the caller 102 exceeds a threshold (704). In various embodiments, various thresholds are used. For example, the threshold can be zero or another integer.

If the action identification module 304 determines that the call count for the caller 102 exceeds the threshold ("YES" of 704), the action performance module 306 automatically adds the call to the front of a call queue (706). The call queue is a list of calls that are on hold until one of the agents 110 becomes available to answer the calls. On the other hand, if the action identification module 304 determines that the call count for the caller 102 does not exceed the threshold ("NO" of 704), the action performance module 306 automatically adds the call to an end of the call queue (708). In this way, if the caller 102 has called a sufficient number of times, the caller 102 is not forced to wait to speak to one of the agents 110 behind people who have not had to call multiple times.

Figure 8:
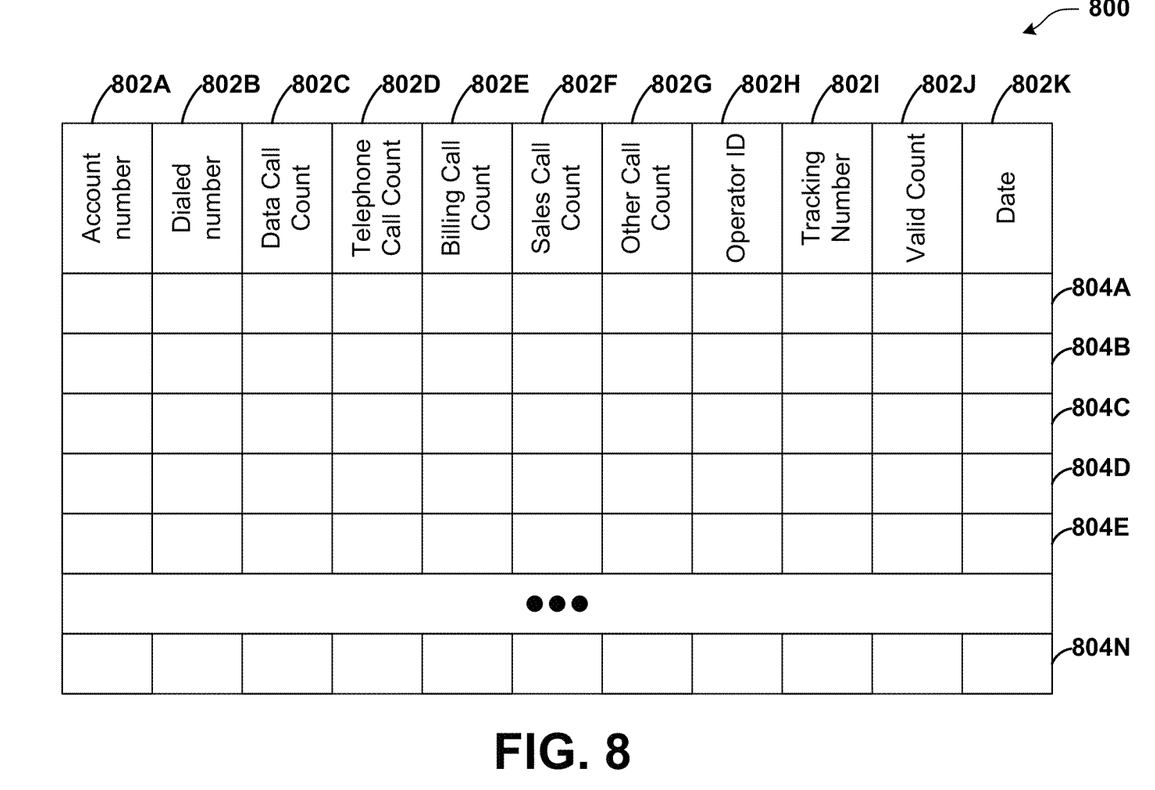
FIG. 8 illustrates an example table in a database.

FIG. 8 illustrates an example table 800 in the database 206. As illustrated in the example of FIG. 8, the table 800 has columns 802A through 802K (collectively, "columns 802") and rows 804A through 804N (collectively, "rows 804").

The rows 804 are records that contain data associated with different callers. Cells in the column 802A contain account numbers for the callers. In other words, account number attributes of the records are stored in the column 802A. Cells in the column 802B contain telephone numbers most recently dialed by the callers. Cells in the column 802C contain data that indicates how many times the callers have called with regard to a data delivery business unit. Cells in the column 802D contain counter attributes that indicate how many times the callers have called with regard to a telephone service business unit. Cells in the column 802E contain counter attributes that indicate how many times the callers have called with regard to a billing business unit. Cells in the column 802F contain counter attributes that indicate how many times the callers have called with regard to a sales business unit. Cells in the column 802G contain counter attributes that indicate how many times the callers have called with regard to other business units. Cells in the column 802H identify agents who most recently answers calls from the callers. Cells in the column 802I include tracking numbers for the callers. Cells in the column 802J indicate total numbers of times that callers have called with regard to all business units. Cells in the column 802K indicate the most recent time and date when the callers called. In other words, most-recent-call attributes of the records are stored in the column 802K.

FIG. 9 illustrates an example report 900 that summarizes repeat calls by day. As illustrated in the example of FIG. 9, the report 900 includes a row 902, a row 904, and a row 906. The row 902 contains a number indicating a total number of callers (i.e., 2306) during Apr. 8, 2010. The row 902 also contains a number indicating a total number of repeat callers (i.e., 757) during Apr. 8, 2010. The row 902 also contains a percentage of repeat callers to total callers (32.83%) for Apr. 8, 2010. The row 904 contains a number indicating a total number of callers (i.e., 2502) during Apr. 9, 2010. The row 904 also contains a number indicating a total number of repeat callers (i.e., 632) during Apr. 9, 2010. The row 904 also contains a percentage of repeat callers to total callers (25.26%) for Apr. 9, 2010.

The row 906 contains a grand total of the total callers (i.e., 4808) for the days Apr. 8 and 9, 2010. The row 906 also contains a grand total of the repeat callers (i.e., 1389) for the days Apr. 8 and 9, 2010. The row 906 also contains an overall percentage of repeat callers to total callers for the days Apr. 8 and 9, 2010.

Figure 10:
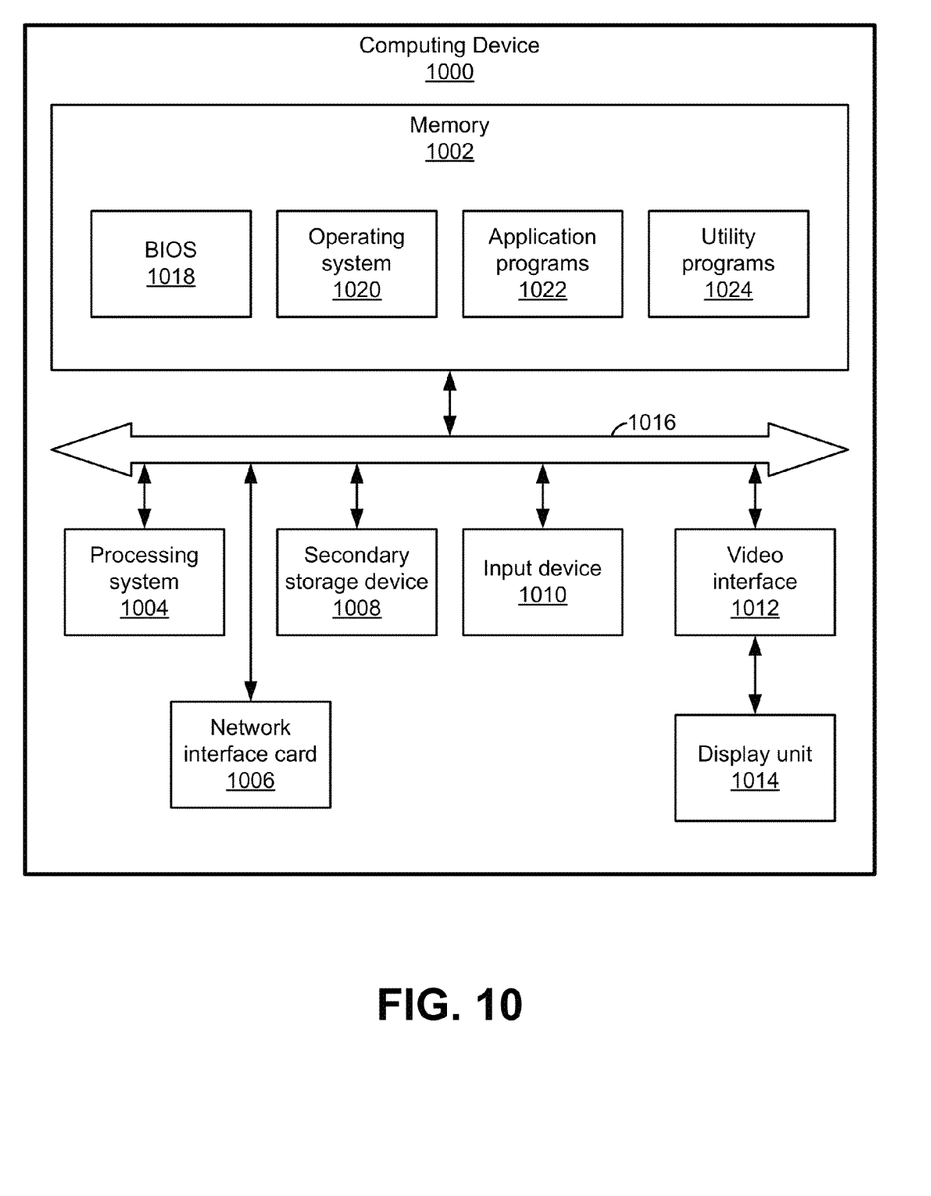
FIG. 10 is a block diagram illustrating an example computing device.

FIG. 10 is a block diagram illustrating an example computing device 1000. In some embodiments, the call handling system 108, the telephone 104, and/or the computers 112 are implemented using one or more computing devices like the computing device 1000. It should be appreciated that in other embodiments, the call handling system 108, the telephone 104, and/or the computers 112 are implemented using computing devices having hardware components other than those illustrated in the example of FIG. 10.

Computing devices are implemented in different ways in different embodiments. For instance, in the example of FIG. 10, the computing device 1000 comprises a memory 1002, a processing system 1004, a network interface 1006, a secondary storage device 1008, an input device 1010, a video interface 1012, a display unit 1014, and a communication medium 1016. In other embodiments, the computing device 1000 is implemented using more or fewer hardware components (e.g., a video interface, a display unit, or an input device).

In this patent document, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

In this patent document, the term computer-readable storage medium refers to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The memory 1002 includes one or more computer-readable storage media capable of storing data and/or computer-executable instructions. In various embodiments, the memory 1002 is implemented in various ways. For example, the memory 1002 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The processing system 1004 includes one or more processing units, which may include tangible integrated circuits that selectively execute computer-executable instructions. In various embodiments, the processing units in the processing system 1004 are implemented in various ways. For example, the processing units in the processing system 1004 can be implemented as one or more processing cores. In this example, the processing system 1004 can comprise one or more Intel Core microprocessors. In another example, the processing system 1004 can comprise one or more separate microprocessors. In yet another example embodiment, the processing system 1004 can comprise Application-Specific Integrated Circuits (ASICs) that provide specific functionality. In yet another example, the processing system 1004 provides specific functionality by using an ASIC and by executing computer-executable instructions.

The computing device 1000 may be enabled to send data to and receive data from a communication network via a network interface card 1006. In different embodiments, the network interface card 1006 is implemented in different ways, such as an Ethernet interface, a token-ring network interface, a fiber optic network interface, a wireless network interface (e.g., WiFi, WiMax, etc.), or another type of network interface.

The secondary storage device 1008 includes one or more computer-readable storage media, and may store data and computer-executable instructions not directly accessible by the processing system 1004. That is, the processing system 1004 performs an I/O operation to retrieve data and/or computer-executable instructions from the secondary storage device 1008. In various embodiments, the secondary storage device 1008 can be implemented as various types of computer-readable storage media, such as by one or more magnetic disks, magnetic tape drives, CD-ROM discs, DVD-ROM discs, Blu-Ray discs, solid state memory devices, and/or other types of computer-readable storage media.

The input device 1010 enables the computing device 1000 to receive input from a user. Example types of input devices include, but are not limited to, keyboards, mice, trackballs, stylus input devices, key pads, microphones, joysticks, touch-sensitive display screens, and other types of devices that provide user input to the computing device 1000.

The video interface 1012 outputs video information to the display unit 1014. In different embodiments, the video interface 1012 is implemented in different ways. For example, the video interface 1012 is a video expansion card. In another example, the video interface 1012 is integrated into a motherboard of the computing device 1000. In various embodiments, the display unit 1014 can be a an LCD display panel, a touch-sensitive display panel, an LED screen, a projector, a cathode-ray tube display, or another type of display unit. In various embodiments, the video interface 1012 communicates with the display unit 1014 in various ways. For example, the video interface 1012 can communicate with the display unit 1014 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 1016 facilitates communication among the hardware components of the computing device 1000. In different embodiments, the communications medium 1016 facilitates communication among different components of the computing device 1000. For instance, in the example of FIG. 10, the communications medium 1016 facilitates communication among the memory 1002, the processing system 1004, the network interface card 1006, the secondary storage device 1008, the input device 1010, and the video interface 1012. In different embodiments, the communications medium 1016 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 1002 stores various types of data and/or software instructions. For instance, in the example of FIG. 10, the memory 1002 stores a Basic Input/Output System (BIOS) 1018, and an operating system 1020. The BIOS 1018 includes a set of software instructions that, when executed by the processing system 1004, cause the computing device 1000 to boot up. The operating system 1020 includes a set of software instructions that, when executed by the processing system 1004, cause the computing device 1000 to provide an operating system that coordinates the activities and sharing of resources of the computing device 1000. The memory 1002 also stores one or more application programs 1022 that, when executed by the processing system 1004, cause the computing device 1000 to provide applications to users. The memory 1002 also stores one or more utility programs 1024 that, when executed by the processing system 1004, cause the computing device 1000 to provide utilities to other software programs.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

As described herein, identifying actions to take with regard to repeat callers is provided. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A method for identifying actions to take with regard to repeat callers, the method comprising:
   receiving, by a call handling system, an incoming call from a caller;
   determining a call count for the caller, the call count for the caller being based on a number of calls in a sequence of calls received by the call handling system from the caller, the sequence of calls including the incoming call, wherein an amount of time between the incoming call and a previous call in the sequence of calls does not exceed an expiration period, when the call handling system does not include a call count within the expiration period the call handling system purging the call count, when the call handling system includes a call count within the expiration period the call handling system incrementing the call count;
   identifying, by the call handling system based on the call count for the caller, an action from among a plurality of actions available to take with regard to the incoming call; and
   after identifying the action, performing the action with regard to the incoming call.

2. The method of claim 1, wherein the method further comprises:
   in response to receiving the incoming call, determine a relevant business unit from among a plurality of business units, wherein the caller wants to speak about the relevant business unit;

storing a record for the caller in a database, the record including counter attributes for each business unit in the plurality of business units; and updating the record for the caller to increase the counter attribute for the relevant business unit.

3. The method of claim 2, wherein the call count for the caller indicates the number of calls in the sequence of calls in which the caller wants to speak about the relevant business unit.

4. The method of claim 2, wherein the method further comprises:

receiving, by the call handling system, a second incoming call from the caller;

in response to receiving the second incoming call, determining that the caller wants to speak about a second business unit in the plurality of business units;

updating the record for the caller to increase the counter attribute for the second business unit;

determining, by the call handling system, a second call count for the caller, the second call count for the caller based at least in part on the counter attribute for the second business unit;

identifying, by the call handling system, a second action from among the plurality of actions; and after identifying the second action, performing the second action with regard to the second incoming call.

5. The method of claim 1, wherein a set of agents are divided into a plurality of subgroups; and wherein performing the action comprises routing the incoming call to an agent in a given subgroup in the plurality of subgroups.

6. The method of claim 1, wherein performing the action comprises adding the incoming call to a front of a call queue.

7. The method of claim 1, further comprising: generating a report that lists total numbers of callers on one or more days, numbers of repeat callers on each of the one or more days, percentages of repeat callers on each of the one or more days.

8. The method of claim 1, further comprising: generating a report that breaks down percentages of repeat callers by business unit.

9. The method of claim 1, further comprising: storing records in a database, each of the records being associated with different callers, each of the records having an account number attribute, a most-recent-call attribute and a counter attribute, the account number attributes indicating account numbers for the callers, the most-recent-call attributes indicating most recent times that calls were received from the callers, the counter attributes indicating numbers of calls received from the callers.

10. The method of claim 9, wherein determining the call count for the caller comprises:

querying the database for ones of the records that specify account numbers that match an account number for the caller;

determining whether any records were returned by querying the database;

creating a new record in the database when no records were returned by querying the database, the new record having an account number attribute indicating the account number for the caller, a counter attribute indicating that one call has been received from the caller, and a most-recent-call attribute indicating a current time; and performing the following steps when an existing record is returned by querying the database:

updating the existing record to increase the counter attribute of the existing record and to set the most-recent-call attribute of the existing record to indicate the current time; and calculating the call count for the caller using at least the counter attribute of the existing record.

11. The method of claim 10, further comprising: purging old records from the database, wherein the expiration period has passed after times indicated by most-recent-call attributes of the old records.

12. The method of claim 1, wherein the call handling system comprises an automatic call distributor (ACD) and a Computer-Telephony Interface (CTI) server;

wherein determining the call count for the caller comprises:

sending, by the ACD, a call count request to the CTI server;

receiving, by the ACD, a call count response from the CTI server, the call count response specifying the call count for the caller.

13. A call handling system comprising:

an automatic call distributor (ACD) that comprises:

a call reception module that receives an incoming call from a caller;

an action identification module that identifies a given action from among a plurality of actions available to take with regard to the incoming call, the action identification module identifying the given action based on a call count for the caller, the call count for the caller indicating a number of calls in a sequence of calls received by the call handling system from the caller, the sequence of calls including the incoming call, wherein an amount of time between the incoming call and a previous call in the sequence of calls does not exceed an expiration period, when the call handling system does not include a call count within the expiration period the call handling system purging the call count, when the call handling system includes a call count within the expiration period the call handling system incrementing the call count; and an action performance module that performs the given action with regard to the incoming call.

14. The call handling system of claim 13, further comprising: a database that stores records, each of the records being associated with different callers, each of the records having an account number attribute, a most-recent-call attribute and a counter attribute, the account number attributes indicating account numbers for the callers, the most-recent-call attributes indicating most recent times that calls were received from the callers, the counter attributes indicating numbers of calls received from the callers.

15. The call handling system of claim 14, wherein the call handling system further comprises a Computer-Telephony Interface (CTI) server;

wherein the ACD further comprises a call count module that sends a call count request to the CTI server after the call reception module receives the incoming call; and wherein the call count module receives a call count response from the CTI server, the call count response indicating the call count for the caller.

16. The call handling system of claim 15, wherein the call handling system further comprises a workflow engine that is able to execute workflows provided to the workflow engine;

wherein in response to receiving the call count request, the CTI server instructs the workflow engine to execute a workflow; and wherein when the workflow engine executes the workflow, the workflow engine provides the call count for the caller to the CTI server.

17. The call handling system of claim 16, wherein when the workflow engine executes the workflow, the workflow engine performs at least the following steps:
   querying the database for ones of the records that specify account numbers that match an account number for the caller;
   determining whether any records were returned by querying the database;
   creating a new record in the database when no records were returned by querying the database, the new record having an account number attribute indicating the account number for the caller, a counter attribute indicating that one call has been received from the caller, and a most-recent-call attribute indicating a current time;
   performing the following steps when an existing record is returned by querying the database:
      updating the existing record to increase the counter attribute of the existing record and to set the most-recent-call attribute of the existing record to indicate the current time; and
      calculating the call count for the caller using at least the counter attribute of the existing record; and
   purging old records from the database, wherein the expiration period has passed after times indicated by most-recent-call attributes of the old records.

18. The call handling system of claim 13, wherein the action identification module identifies the given action based on the call count for the caller by comparing the call count for the caller to a threshold and identifying the given action from among the plurality of actions when the call count for the caller exceeds the threshold.

19. The call handling system of claim 18, wherein the given action comprises routing the incoming call to a senior agent.

20. A computer-readable storage device that stores computer-executable instructions that, when executed by a computing device, cause the computing device to:
   receive a call count request from an automatic call distributor (ACD), the call count request requesting a call count for a caller;
   obtain an account number for the caller;
   identify a relevant business unit from among a plurality of business units, wherein the caller wants to speak with an agent regarding the relevant business unit;
   query a database for records that specify account numbers that match the account number for the caller, the database storing records associated with different callers, each of the records having an account number attribute, a most-recent-call attribute, and a counter attribute, the account number attributes indicating account numbers for the callers, the most-recent-call attributes indicating most recent times that calls were received from the callers, the counter attributes indicating numbers of calls received from the callers;
   determine whether any records were returned by querying the database;
   perform the following steps when no records were returned by querying the database:
      create a new record in the database, the new record having an account number attribute indicating the account number for the caller, a counter attribute indicating that one call has been received from the caller, and a most-recent-call attribute indicating a current time; and
      set the call count for the caller to a value that indicates that the ACD has received no calls from the caller within an expiration period following a most recently received call from the caller;
   perform the following steps when an existing record is returned by querying the database:
      updating the existing record to increase the counter attribute of the existing record and to set the most-recent-call attribute of the existing record to indicate the current time; and
      calculate the call count for the caller using at least the counter attribute of the existing record;
   purge old records from the database, wherein the expiration period has passed after times indicated by most-recent-call attributes of the old records; and
   provide a call count response to the ACD, the call count response specifying the call count for the caller.

* * * * *